Figure 1:
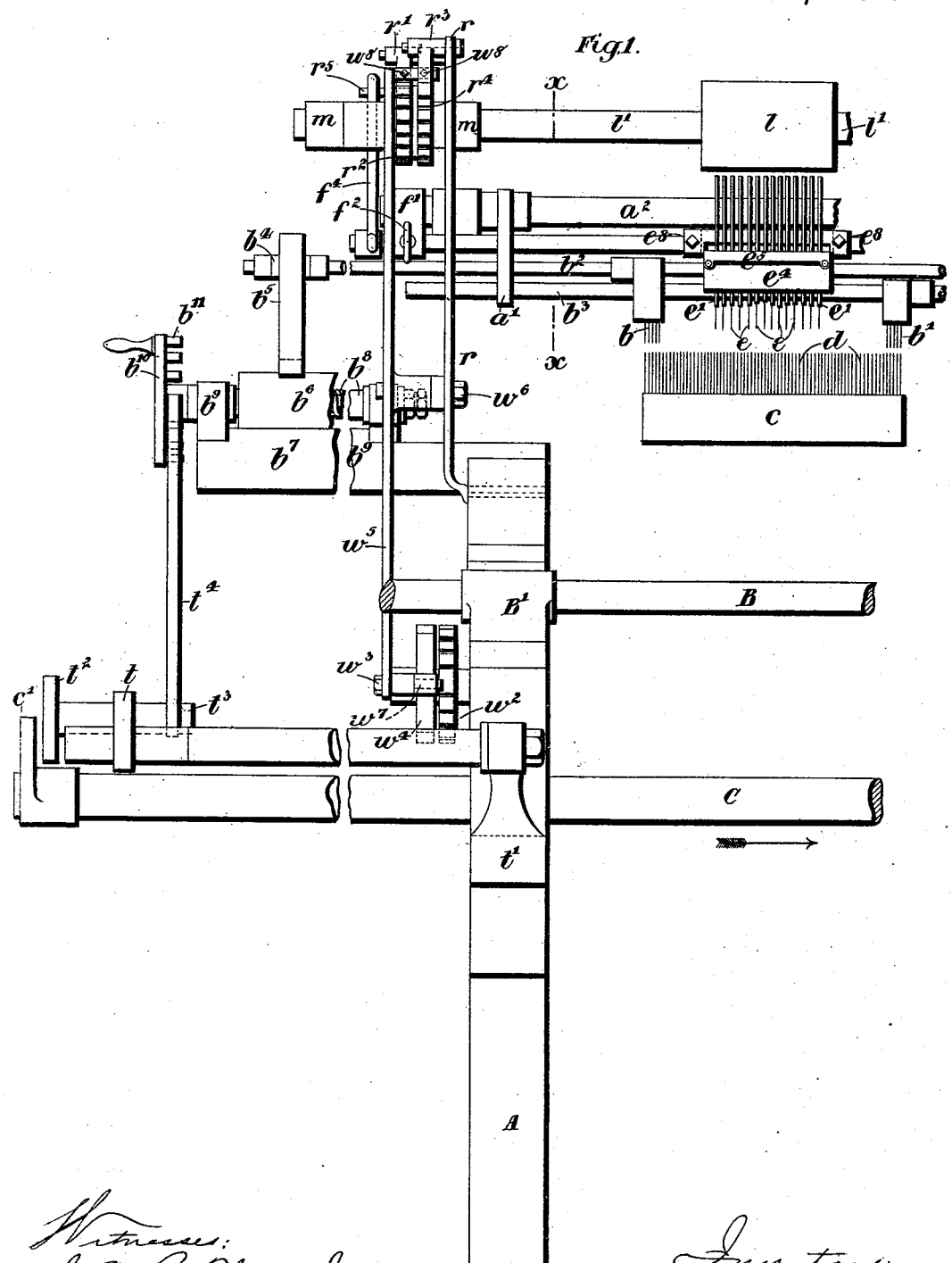

(No Model.) 10 Sheets—Sheet 1.

H. CLARKE & T. MAWBY.
MACHINE FOR MAKING LACE HOSIERY.

No. 486,767. Patented Nov. 22, 1892.

(No Model.) 10 Sheets—Sheet 3.

H. CLARKE & T. MAWBY.
MACHINE FOR MAKING LACE HOSIERY.

No. 486,767. Patented Nov. 22, 1892.

(No Model.) 10 Sheets—Sheet 5.

H. CLARKE & T. MAWBY.
MACHINE FOR MAKING LACE HOSIERY.

No. 486,767. Patented Nov. 22, 1892.

THE NORRIS PETERS CO., PHOTO-LITHO., WASHINGTON, D. C.

(No Model.) 10 Sheets—Sheet 6.
H. CLARKE & T. MAWBY.
MACHINE FOR MAKING LACE HOSIERY.
No. 486,767. Patented Nov. 22, 1892.
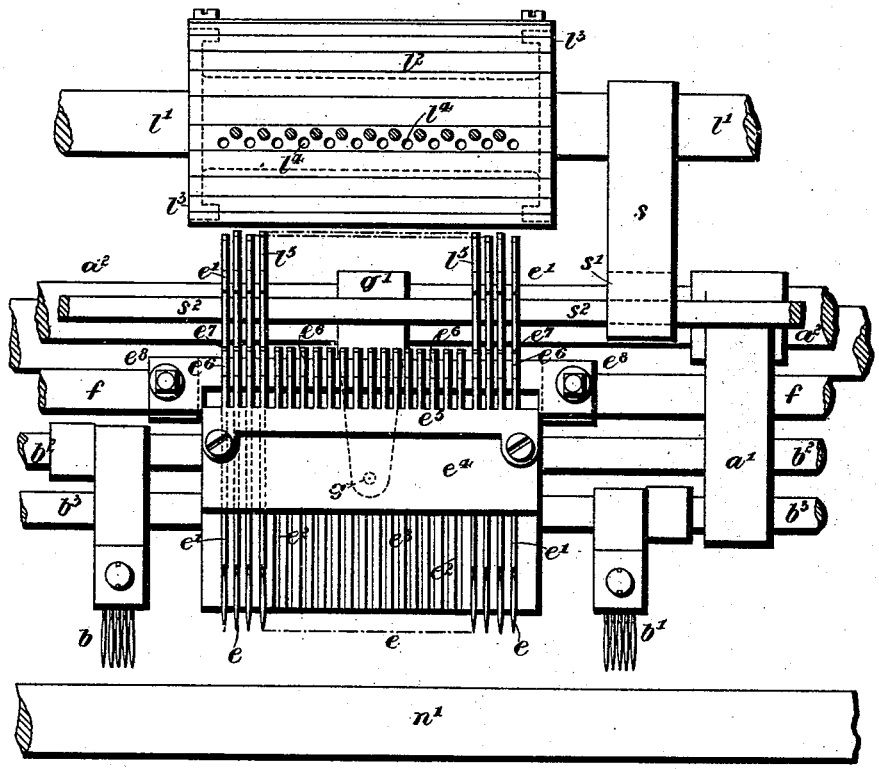

(No Model.) 10 Sheets—Sheet 7.
H. CLARKE & T. MAWBY.
MACHINE FOR MAKING LACE HOSIERY.

No. 486,767. Patented Nov. 22, 1892.

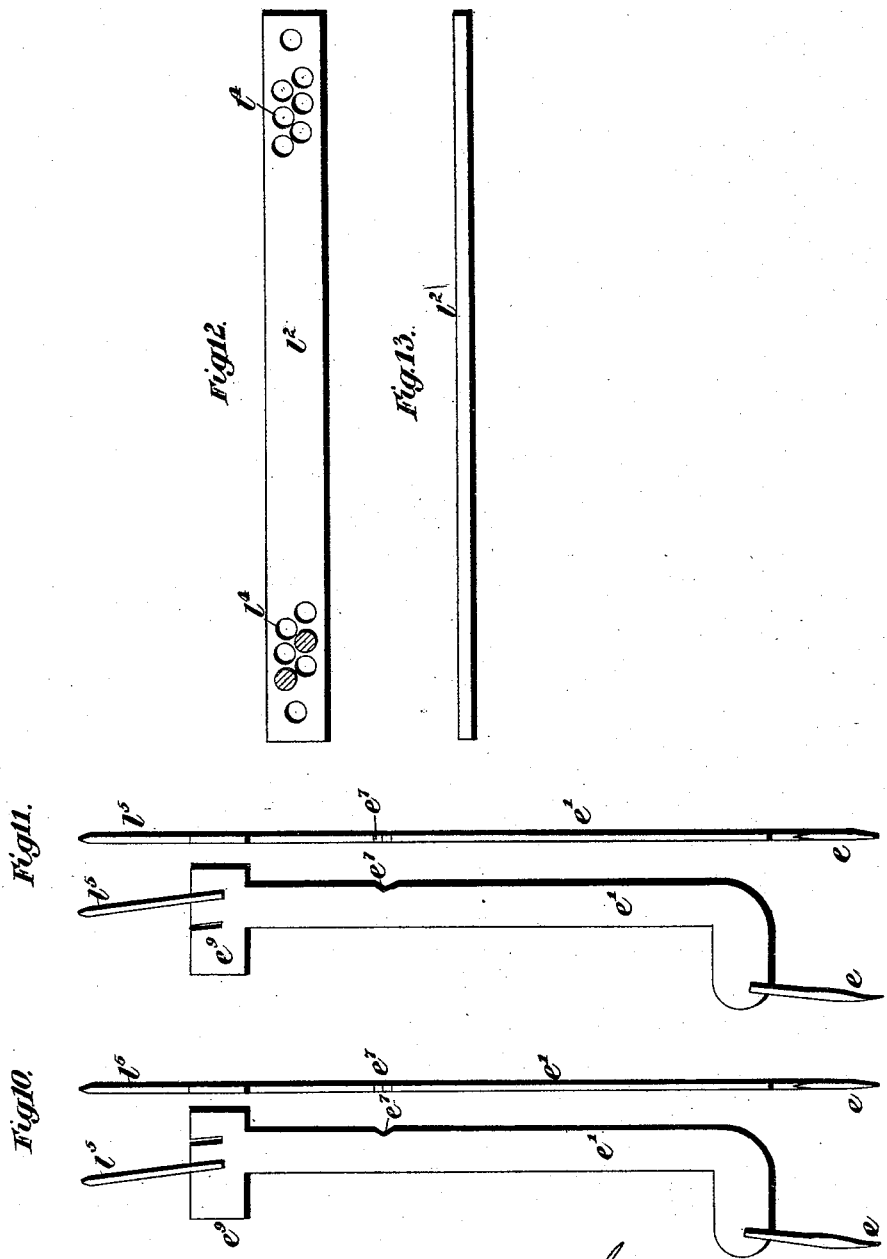

(No Model.) 10 Sheets—Sheet 9.
H. CLARKE & T. MAWBY.
MACHINE FOR MAKING LACE HOSIERY.
No. 486,767. Patented Nov. 22, 1892.
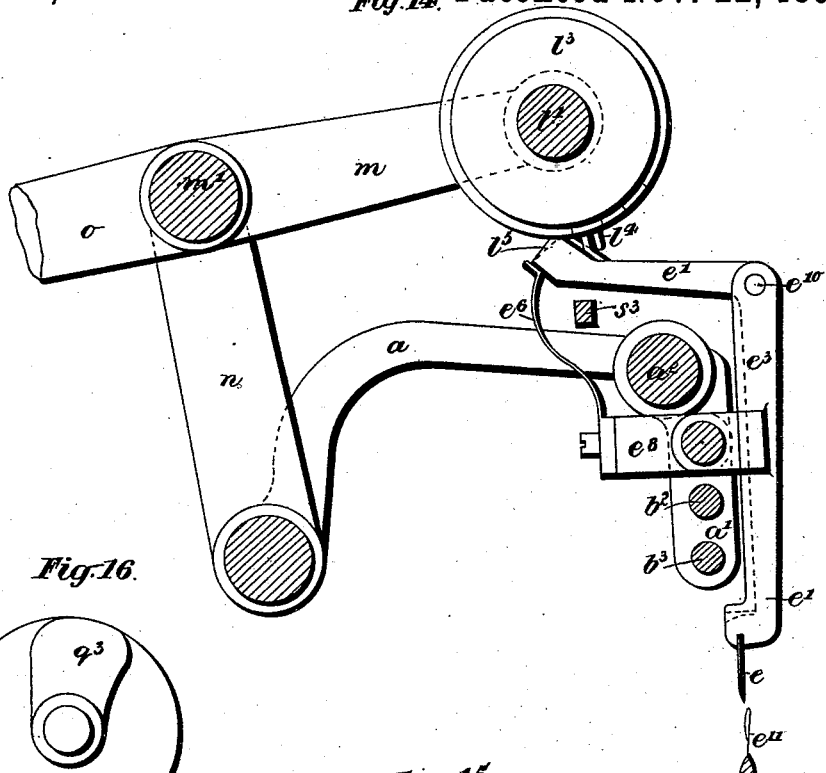
Fig. 14.
Fig. 16.
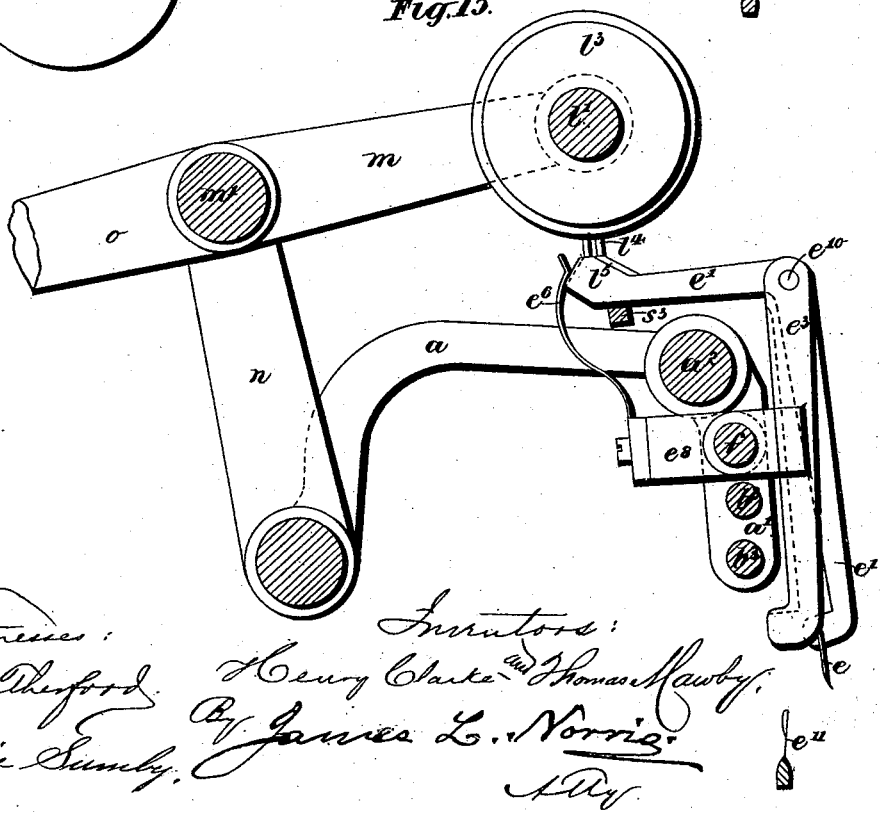
Fig. 15.
Witnesses:
J. A. Rutherford
Dennis Sumby
Inventors:
Henry Clarke and Thomas Mawby
By James L. Norris
Atty.
THE NORRIS PETERS CO., PHOTO-LITHO., WASHINGTON, D. C.

(No Model.) 10 Sheets—Sheet 10.
H. CLARKE & T. MAWBY.
MACHINE FOR MAKING LACE HOSIERY.
No. 486,767. Patented Nov. 22, 1892.
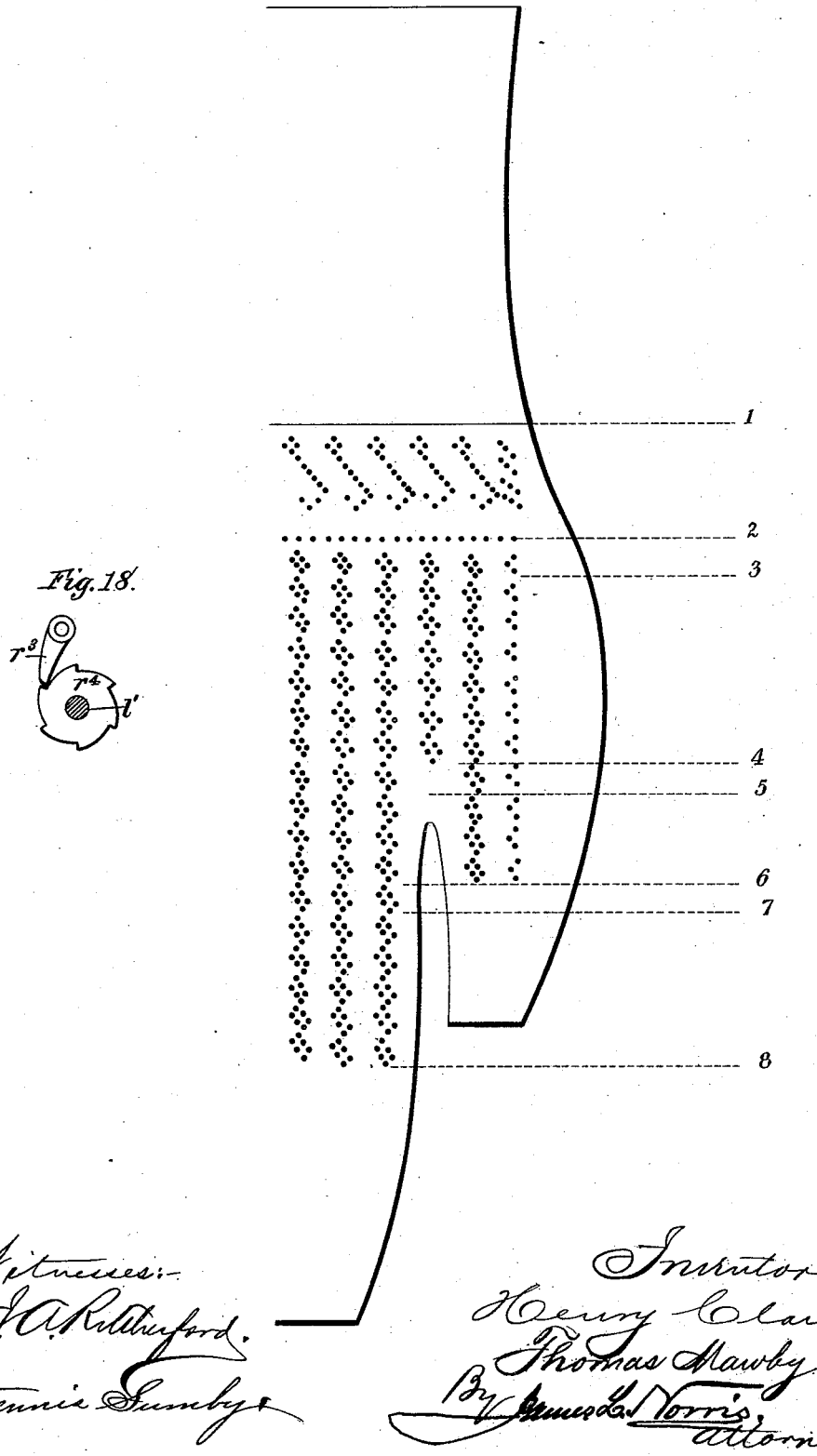

UNITED STATES PATENT OFFICE.

HENRY CLARKE AND THOMAS MAWBY, OF LEICESTER, ENGLAND.

MACHINE FOR MAKING LACE HOSIERY.

SPECIFICATION forming part of Letters Patent No. 486,767, dated November 22, 1892.

Application filed March 21, 1889. Serial No. 304,201. (No model.) Patented in England April 27, 1888, No. 6,277.

*To all whom it may concern:*

Be it known that we, HENRY CLARKE, foreman, and THOMAS MAWBY, hosiery-manufacturer, subjects of the Queen of Great Britain, and both residents of Leicester, England, have invented certain new and useful Improvements in Machines for Making Lace Hosiery, (for which we have obtained a patent in Great Britain, No. 6,277, bearing date April 27, 1888,) of which the following is a specification, reference being had to the accompanying drawings.

Our invention relates to the manufacture of goods or articles comprised under the term "lace hosiery;" and its main object is to provide a machine which will operate automatically to produce such articles in an efficient and expeditious manner and by which we are enabled to dispense in a great measure with hand-labor in the manufacture of lace hosiery.
Our improved machine comprises means for forming the lace-pattern by the taking of loops off one or more of the needles and placing the said loops upon adjacent needles in such a manner that holes will be left in the manufactured article where necessary for the formation of the desired pattern. For this purpose we employ narrowing machine-points, which effect such transfer of the loops and which we will hereinafter term "lace-points;" and we combine with these points and with the other parts of the machine Jacquard mechanism, which will select the "points" to be operated for thus tranferring the loops and thereby regulate or determine the pattern to be produced. We also provide suitable means for imparting lateral reciprocating motion to the lace-points for the purpose of transferring the loops.

Our said invention, moreover, comprises other improvements hereinafter described.

Figure 2:
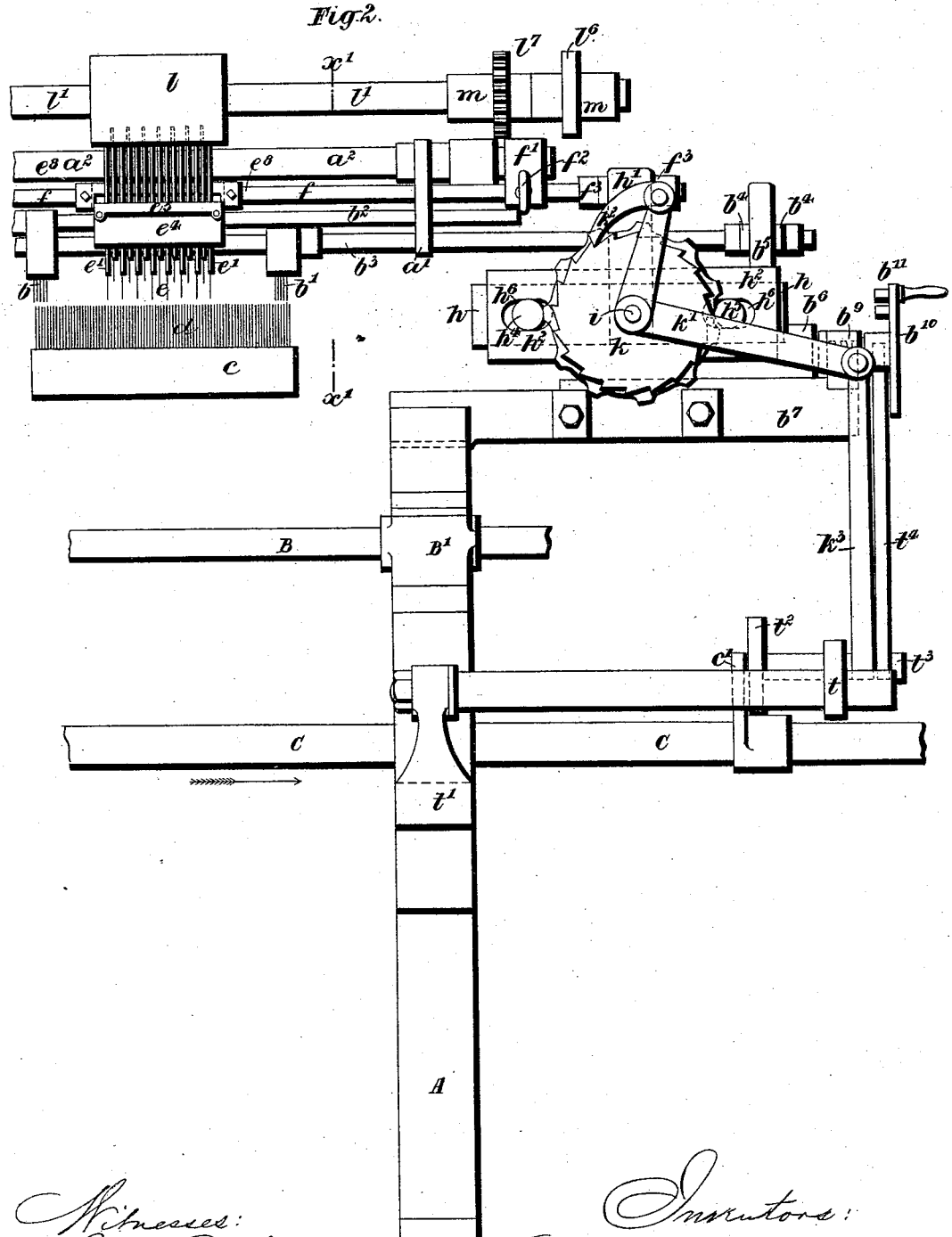
Figure 3:
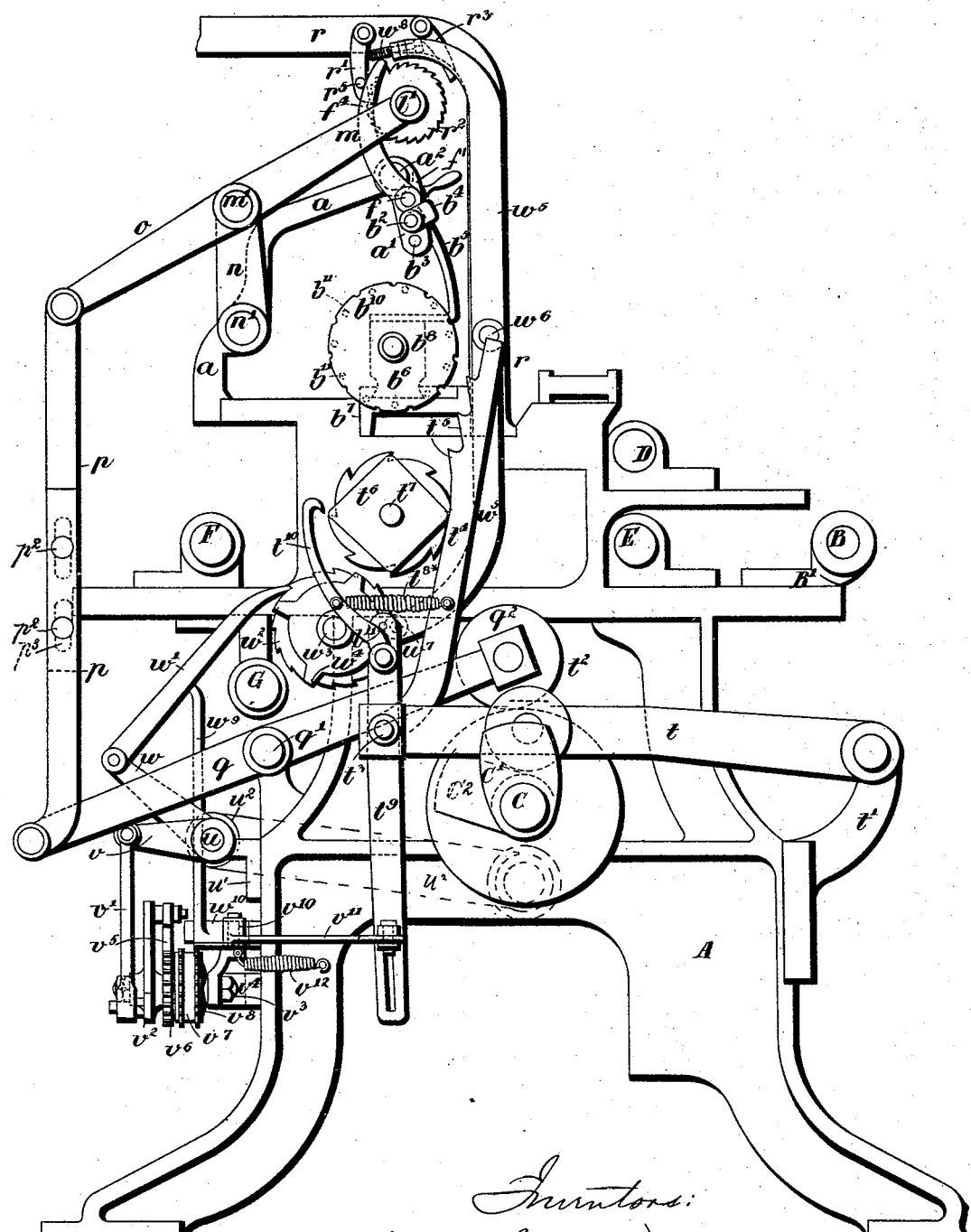
Figure 4:
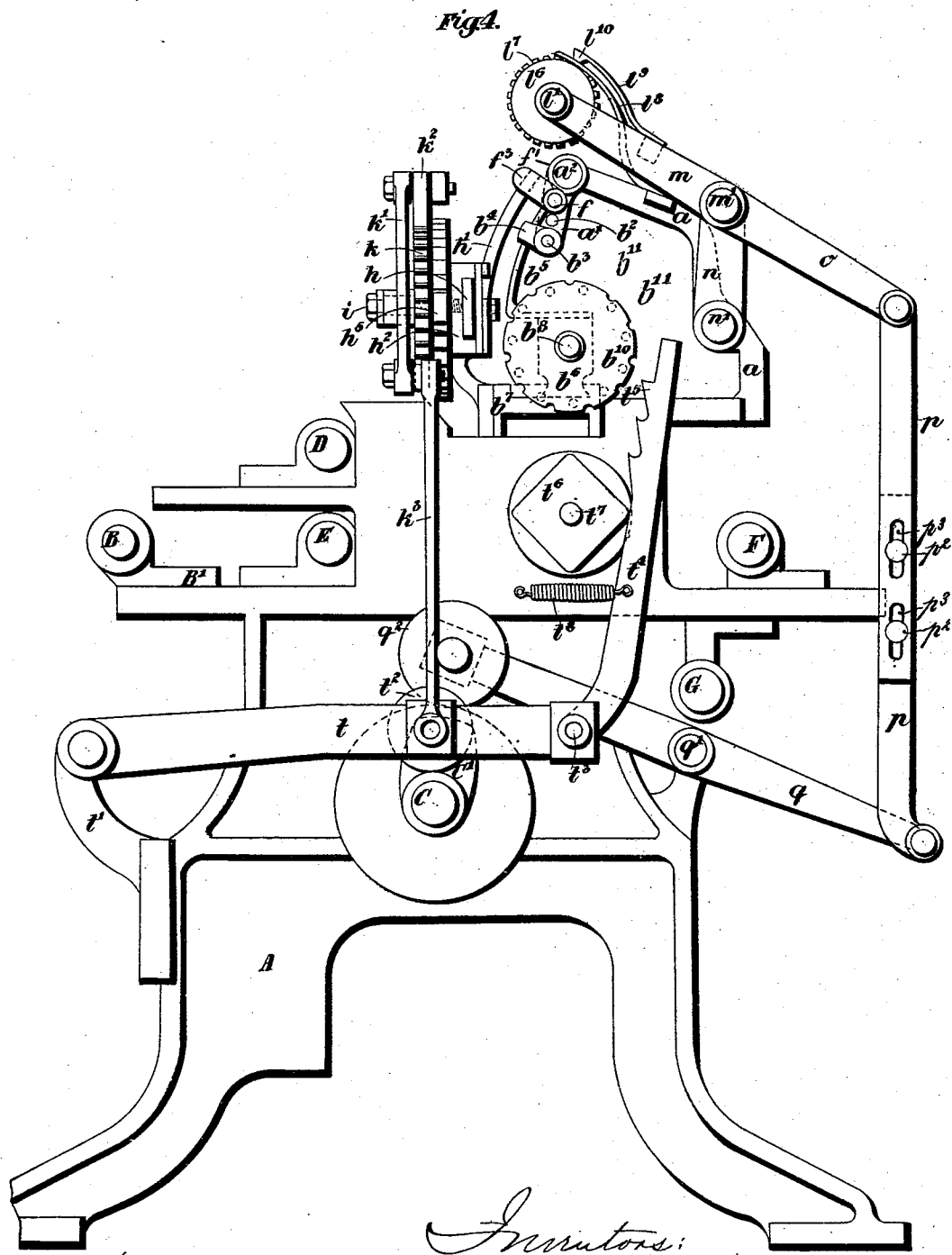
Figure 5:
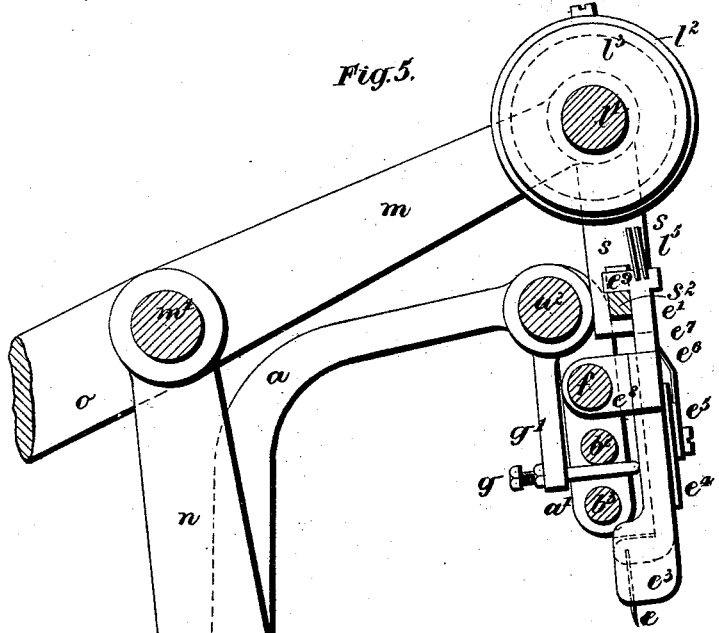
Figure 6:
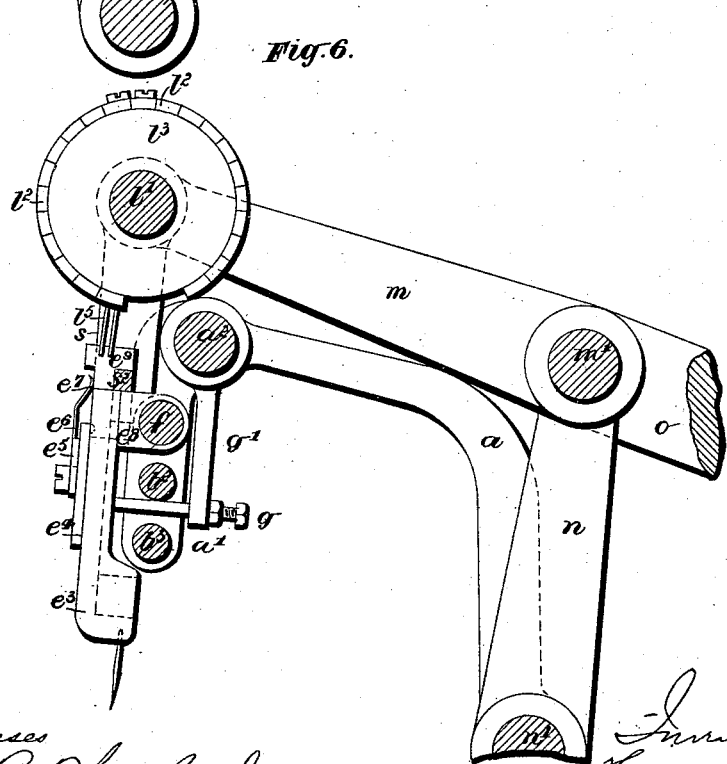

In the accompanying drawings we have shown how our said invention may be conveniently and advantageously carried into practice. Figures 1 and 2 show a front elevation of a machine known as a "Cotton's frame" with our present improvements applied thereto, the central portion of the said machine being removed. Fig. 3 is an elevation of one end of the said machine, and Fig. 4 an elevation of the other end of the same machine, such parts of the said machine as are not necessary to the correct understanding of the novel features being omitted. Fig. 5 is a transverse section through the narrowing and lace-point bars, taken on the line *x x*, Fig. 1. Fig. 6 is a transverse section through the narrowing and lace-point bars, taken on the line *x' x'*, Fig. 2, also showing the Jacquard cylinder depressing the lace-points. Fig. 7 is a front elevation of the lace and narrowing apparatus. Figs. 5, 6, and 7 are drawn to an enlarged scale.

Figure 9:
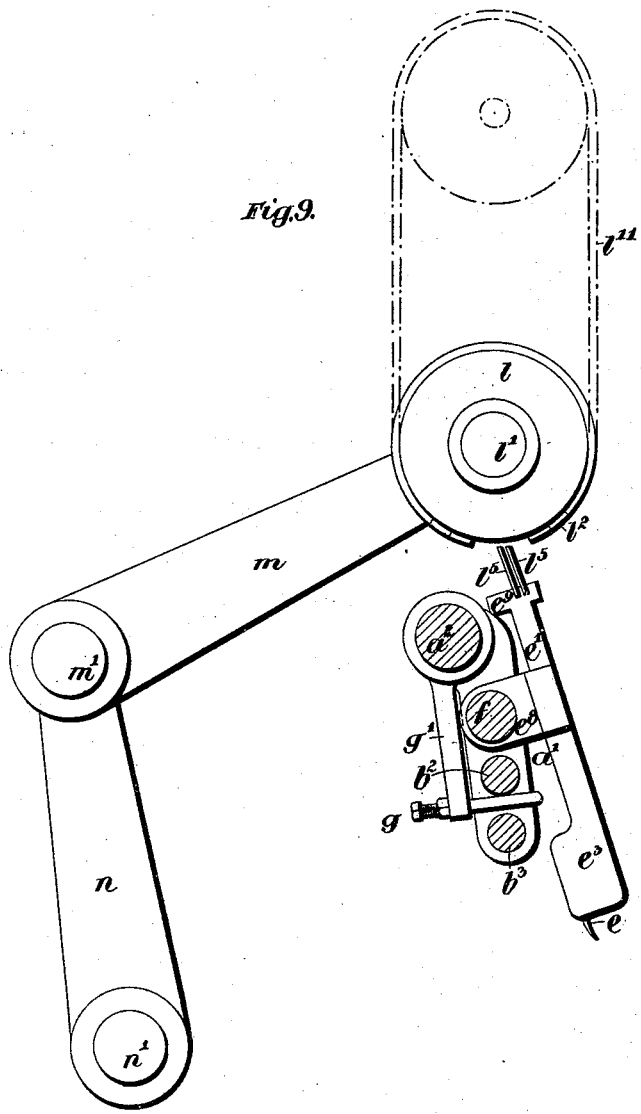

Fig. 8 is a rear elevation of the chain mechanism (hereinafter described) for putting the lace apparatus into operation. Fig. 9 is a transverse section through the narrowing and lace-point bars, showing the lace-points out of action. Fig. 10 shows in side and front elevation the alternate lace-point slides, and Fig. 11 shows in side and front elevation the intermediate slides. Figs. 12 and 13 are face and edge views, respectively, of the Jacquard plates. Figs. 14 and 15 show a modification of our said invention, in which the lace-points are carried by levers instead of slides. In Fig. 15 the lace-points are shown out of action. Fig. 16 is a side elevation of the Jacquard cam. Fig. 17 is a diagram illustrating the manufacture of a lace stocking by our improved machine. Fig. 18 is an elevation of one of the ratchet-wheels for actuating the Jacquard cylinder. Fig. 9 to 15 are also drawn to an enlarged scale.

Like letters indicate corresponding parts throughout the drawings.

In all the figures of the drawings we have shown mainly those parts that are intended for effecting the narrowing of the work and the formation of the lace-patterns, and not the parts for producing ordinary courses of work, as these latter are of the usual construction and their manner of working is well understood.

Referring to Figs. 1 to 13, A A are the end standards forming part of the frame of the machine. B is the first driving-shaft, which is mounted in bearings B' attached to the said standards. A.

C is a cam-shaft for operating various parts of the mechanism hereinafter described. The said cam-shaft is connected by any suitable gearing with the driving-shaft B.

D is the needle-bar shaft; E, the presser-bar shaft; F, the catch-bar shaft; G, the catch-bar lifting-shaft. All the said shafts D E F G are mounted and driven as in an ordinary vertical-frame knitting-machine by mechanism similar to that described and shown in specification of British Letters Patent No. 3,123 of 1864 and 3,820 of 1868, respectively granted to William Cotton and to Cotton and Attenborough. This mechanism forms no part of our said invention.

$a\ a$ are brackets which are firmly attached to the frame of the machine, as shown in Fig. 3, and which support a rod $a^2$ having mounted thereon other brackets $a'$ forming bearings for the narrowing and the lace-point bars hereinafter described.

$b\ b'$ are the sets of narrowing-points, carried, respectively, by narrowing-bars $b^2\ b^3$, which pass through and have their bearings in the said brackets $a'$. Each bar $b^2\ b^3$ is provided with a fork $b^4$, which clips or engages with a tongue $b^5$, firmly attached to or formed with a nut $b^6$, adapted to slide in grooved bearings formed in fixed brackets $b^7$. The said brackets are firmly secured to the frame A. Within the nuts $b^6$ work screws $b^8$, which rotate in bearings $b^9$, attached to the brackets $b^7$, the said screws being reduced at each end where resting in the bearings, so as to form shoulders or collars for preventing endwise movement. The screws $b^8$ are provided with hand-wheels $b^{10}$, whereby they may be rotated by hand to cause the narrowing-points $b\ b'$ in each set to recede from each other after the completion of each article or set of articles. The said hand-wheels are, moreover, provided with projections or pins $b''$, whereby they may be actuated automatically by means hereinafter described for the purpose of racking the points $b\ b'$ inward when producing the narrowing-courses.

$c\ c$ are the needle-bars, and $d\ d$ some of the needles carried thereby. $e\ e$ are the sets of lace-points, the number of sets of these points corresponding with the number of articles which can be simultaneously produced in the machine. The said lace-points $e$ are attached to slides $e'$, which work in grooves $e^2$, Fig. 7, formed in the comb-bar $e^3$.

$e^4$ is a covering-plate, which is screwed or otherwise attached to the comb-bar $e^3$, and which maintains the said slides in position.

$e^5$ is a spring-bar also attached to the face of the comb-bar and formed with springs $e^6$, one for each slide, the said springs being adapted to engage with notches $e^7$, formed in the faces or forward edges of the slides in such a manner that the said springs will maintain the slides in their raised positions until depressed by the action of the Jacquard cylinders, as hereinafter described. The comb-bars $e^3$ are firmly attached to bosses $e^8$, fixed on the lace-point bar $f$. This bar has its bearings in the brackets $a'$, in which it is capable of endwise movement. The said bar is, moreover, provided with collars $f'$, Figs. 1 and 2, which slide freely on the rod $a^2$, the said collars being attached by thumb-screws $f^2$ or other suitable means to the bar $f$. By these means the bar $f$ is kept in position. Adjustable screw-stops $g$, Figs. 5 and 6, are also provided, which pass through brackets $g'$, fixed on the rod $a^2$, against which the comb-bars $e^3$ recline, and by means of which—that is to say, by screwing the said screws in or out—the angle of repose of the said comb-bars may be adjusted.

For effecting the endwise reciprocation of the lace-point bar $f$ the following mechanism is provided—that is to say: On the said bar $f$ is fixed a fork $f^3$, Figs. 2 and 4, in which works an arm $h'$, attached to a block $h$, arranged to slide in a bracket $h^2$, firmly attached to the frame of the machine. Moreover, the sliding block $h$ is provided with two pins $h^4\ h^5$, which project through longitudinal slots $h^6$, formed in the bracket $h^2$. A pin or stud $i$ is formed with or attached to the said bracket $h^2$ and on this pin or stud is mounted a combined ratchet and pattern wheel $k$ and a bell-crank lever $k'$, provided with a pawl or "clawker" $k^2$, which engages with the teeth of the said ratchet-wheel. The lever $k'$ is operated in the manner hereinafter described, so as to intermittently rotate the said ratchet and pattern-wheel $k$, and the periphery of the latter is suitably shaped to engage with the pins $h^4\ h^5$ and cause the said pins, and therefore the block $h$, to slide or reciprocate in the bracket $h^2$, thereby reciprocating the bar $f$ and the sets of points $e$. The said pattern-wheel may be so shaped as to reciprocate the bar $f$ through a distance equal to the gage of one or more needles, as the pattern may require. The clawker or pawl $k^2$ can be put out of gear with the wheel $k$ by any suitable means when it is required not to reciprocate the said points $e$—as, for example, when the toe of the hose is being finished without lacework.

$l\ l$ are the Jacquard cylinders, which are mounted on a shaft $l'$, fitted to rotate in bearings formed in the ends of arms $m$. The said arms $m$ are keyed on a shaft $m'$, which is carried by links $n$, pivoted at $n'$ to the brackets $a$. We provide one Jacquard cylinder for each set of lace-points $e$. The surfaces of the said cylinders are formed of longitudinal plates or lags $l^2$, which are fastened by screws or otherwise to end disks $l^3$. The said plates $l^2$ are perforated with suitable holes $l^4$, some of which are filled by means of plugs, according to the lace-pattern to be produced. The said cylinders $l$ are actuated by the following mechanism—that is to say: On the shaft $m'$ are keyed suitable arms $o$, which are connected by means of rods $p$ with levers $q$, pivoted at $q'$ to one of the tie-rods of the frame or to any other suitable fixed support. The levers $q$ are, moreover, provided at their inner or forward ends with rollers $q^2$, which are acted upon by suitable cams $q^3$, fixed on the cam-shaft C. One of these cams is shown in Fig. 16. The rods $p$ are made in two parts joined in such a manner that their length can be adjusted to regulate the height or position of the Jacquard cylinders. For instance, the two parts are connected by bolts $p^2$, passed through holes in one part and through elongated slots $p^3$ in the other part, as shown in Fig. 3. A bracket $r$, Figs. 1 and 3, is secured to the frame of the machine and to this bracket is pivoted a pawl $r'$. The said pawl is adapted to engage, when free, with a ratchet-wheel $r^2$, fixed on the Jacquard cylinder-shaft $l'$, each time the latter is raised through the operation of the above-mentioned cam $q^3$, and partially rotates the said shaft $l'$. Another pawl $r^3$ is pivoted to the bracket $r$ and is adapted to engage with another ratchet-wheel $r^4$, Fig. 18, also keyed on the shaft $l'$. This second pawl operates to rotate the shaft $l'$ in the contrary direction to that in which the said shaft is rotated by the pawl $r'$, but both pawls are never in gear at the same time, suitable means, hereinafter described, being provided for throwing either pawl out of gear with its ratchet-wheel when the other pawl is required to act. The slides $e'$ that carry the lace-points $e$ are provided at their upper ends with pins or reduced portions $l^5$, more clearly shown in Figs. 10 and 11. These pins are small enough to pass through the perforations $l^4$, formed in the plates of the Jacquard cylinders $l$. On the Jacquard cylinder-shaft $l'$ are fixed two disks or wheels $l^6$ $l^7$, Figs. 2 and 4. The wheel $l^6$ has a plain periphery and the wheel $l^7$ has notches in its periphery, the number of the said notches corresponding to the number of plates or lags $l^2$ on the Jacquard cylinders, and to one of the brackets $a$ is attached a spring $l^8$ which bears against the plain disk $l^6$ and prevents the turning of the shaft $l'$ through too great an angle by either of the operating-pawls $r'$ $r^3$. Another spring $l^9$ is fixed on one of the levers $m$ and is provided with a wedge-shaped piece $l^{10}$ at its extremity, which fits the notches formed in the disk $l^7$ and acts as a gage to regulate or correct the movement of the Jacquard cylinders after each partial rotation thereof when the holes in the plates or lags $l^2$ are exactly over the pins $l^5$ on the upper ends of the lace-point slides.

The operation of the Jacquard mechanism is as follows, viz: On the descent of the Jacquard cylinders $l$, due to the action of the cams $q^3$, with which the rollers $q^2$ engage, one of the plates or lags $l^2$ is brought over the ends of the pins $l^5$, projecting from the slides $e'$. Should any of the open perforations in the said plate or lag then be coincident with the corresponding pins $l^5$, the said perforations will, in the descent of the Jacquard cylinders, pass over the said pins, and the corresponding slides will not be depressed. The pins $l^5$ which correspond with the closed perforations will, however, be depressed, and with them the corresponding slides $e'$ and points $e$. In the depression of any slide $e'$ the corresponding retaining-spring $e^6$ is forced out of its retaining-notch $e^7$. During the upward movement of the cylinder-shaft $l'$ the depressed slides are simultaneously raised by the following devices, viz: On the said shaft $l'$ are loosely mounted a series of hangers $s$, Figs. 5, 6, and 7, each formed with a slot $s'$ near its lower extremity, and through these slots we pass a bar $s^2$, which extends throughout the whole length of the machine. The said bar passes beneath projections $e^9$ on the upper ends of the slides $e'$, and engages with the said projections when it rises with the shaft $l'$, thereby lifting all the depressed slides and bringing their notches $e^7$ again into engagement with the retaining-springs $e^6$. During the upward movement of the shaft $l'$ the ratchet-wheel $r^2$ encounters the pawl $r'$, and the shaft $l'$ is rotated, thereby bringing another plate or lag $l^2$ opposite the pins $l^5$. The second plate may, if required, have a different arrangement of closed holes from the first one. When a continuous pattern is required to be made the pawl $r^3$ is brought into action periodically in the manner hereinafter described, and made to reverse the Jacquard cylinder-shaft $l'$ an amount equal to one, two, three, or more plates or lags $l^2$, as the case may be—that is to say, as many plates or lags as are required for the production of the pattern, and after each reversal the first pawl $r'$ again comes into action, and the process is repeated in a manner that will be well understood.

For automatically reciprocating the lace-points $e$, racking in the narrowing-bars $b^2$ $b^3$, and shipping and unshipping the pawls $r'$ $r^3$ the following mechanism is provided—that is to say: $t$ $t$, Figs. 1 to 4, are levers pivoted to brackets $t'$, secured to the standards A. The said levers are provided with rollers $t^2$, which rest on and are moved up and down by cams $C'$, fixed on the cam-shaft C. The said cams $C'$ are only in engagement with the said levers when a narrowing or lace course is being produced. The said cams $C'$ are moved out of gear with the rollers $t^2$ when it is desired to make an ordinary course by "shogging" or moving the cam-shaft C endwise, as is well understood. It is this position of the cam-shaft that is shown in the drawings. $t^4$ $t^4$ are rods pivoted at $t^3$ to the levers $t$, and provided near their upper ends with rack-teeth $t^5$. $t^6$, Fig. 3, is a combined cam and ratchet wheel provided at one end of the machine and which is keyed on a shaft $t^7$, the cam being arranged to engage with one of the rack-rods $t^4$. The shaft $t^7$ extends the whole length of the machine, and another cam $t^6$ is secured at its other end, this cam engaging with the other rack-rod $t^4$. The said rods $t^4$ are pressed against these cams by means of springs $t^{8*}$, Fig. 3, and $t^8$, Fig. 4. $t^9$ is a lever also pivoted at $t^3$ to one of the levers $t$, and to which is pivoted a catch or pawl $t^{10}$, adapted to engage with a ratchet-wheel formed or fixed on the wheel $t^6$. The said pawl $t^{10}$ bears against a stud $t^{11}$, fixed in the lever $t^9$, and is maintained against this stud by the spring $t^{8*}$, Fig. 3.

$u$, Figs. 3 and 8, is a shaft mounted in bearings in brackets $u'$, fixed to the end standard A, the said shaft being caused to oscillate by means of a cam or eccentric $C^2$, fixed on the cam-shaft C, which actuates a lever $u^3$, fixed to the said shaft $u$.

$v$ is an arm attached to the shaft $u$ and coupled by means of a link $v'$ with a bell-crank lever $v^2$, pivoted at $v^3$ to a bracket $v^4$, fixed to the standard A, as more clearly shown in Fig. 8.

$v^5$ is a pawl pivoted to the bell-crank lever $v^2$ and arranged to actuate a ratchet-wheel $v^6$ and pattern-chain wheel $v^7$, both of which rotate on the same pivot $v^3$ as the said bell-crank lever. The said chain-wheel is prevented from being jerked too far by the pawl by means of a multiple-armed friction-spring $v^8$ of the kind ordinarily used for preventing the overrunning of wheels.

$v^9$ is a lever pivoted at $v^{10}$ on the bracket $v^4$ and coupled by a link $v^{11}$ to the lever $t^9$. The sides of the studs or lugs on the pattern-chain next to the lever $v^9$ comes in contact with the said lever when a narrowing course is required and actuate the said lever and through it the lever $t^9$, thereby putting the pawl $t^{10}$ in gear with the ratchet-wheel $t^6$. The up-and-down movement of the lever $t^9$ then rotates the said combined ratchet-wheel and cam, and, the smaller radius of the cams coming opposite the rack-rods $t^4$, the latter are drawn inward by the springs $t^{8*}$ and $t^8$ and caused to gear with the pegs $b^{11}$ on the wheels $b^{10}$, which are keyed on the screws $b^8$. The rotation of the latter racks in the narrowing-rods $b^2 b^3$, as hereinafter described. A strong spring $v^{12}$, connected at one end to the lever $v^9$ and at the other end to the frame of the machine, draws the lever $v^9$ back to its normal position immediately the studs on the pattern-chain have left the said lever, thereby disengaging again the pawl $t^{10}$, the said spring $v^{12}$ being stronger than the spring $t^{8*}$. One of the levers $t$ is, moreover, connected by a link $k^3$ with the bell-crank lever $k'$, and the reciprocating movement of the said lever $t$ actuates thereby the pattern-wheel $k$ at the same time that the machine effects an ordinary narrowing, unless the pawl $k^2$ is thrown out of gear—as, for example, when lacework is not required. An arm $w$ is also fixed on the shaft $u$ and is provided with a pawl or clawker $w'$, which engages with the teeth of a ratchet-wheel $w^2$, which is free to rotate on a short shaft $w^3$, secured to the end standard A. A cam-wheel $w^4$, also mounted on the shaft $w^3$ is arranged to be rotated by and with the ratchet-wheel $w^2$.

$w^5$ is a lever pivoted at $w^6$ to the bracket $r$ and having a runner $w^7$ attached to its lower extremity for engaging with the pattern cam or wheel $w^4$. The upper end of the said lever $w^5$ is provided with an adjustable screw stop or stops $w^8$, the ends of which engage with the two pawls $r'$ $r^3$ in such a way as to prevent both pawls being in gear with their respective ratchet-wheels $r^2$ $r^4$ at the same time. On the said ratchet-wheel $w^2$ being rotated, the lever $w^5$ is oscillated by the cam $w^4$ and the two pawls $r'$ $r^3$ are alternately put in and out of gear, thereby actuating the Jacquard cylinders in the manner hereinbefore described. The pawl $w'$, that actuates the ratchet-wheel $w^2$, is put in and out of gear by means of the studs on the pattern-chain. A bell-crank lever $w^9$, pivoted at $w^{10}$ to the end standard A, is curved at its upper end, the curved portion extending under the said pawl $w'$. The upper surface of the studs or lugs on the pattern-chain $v^7$ encounters this lever $w^9$ and actuates it in such a manner as to cause the said lever to lift the pawl $w'$ out of gear when it is required not to reverse the motion of the Jacquard cylinders.

By unscrewing the thumb-screws $f^2$, the lace-point bar $f$ is released and the comb-bar $e^3$ may then be raised, as shown in Fig. 9, so as to throw the pins $l^5$ out of action and to enable the narrowing-points to be brought nearer the center of the sets of needles. To provide room for the pins $l^5$, when thrown out of action, we omit one or more of the plates or lags $l^2$, thus forming a blank space. Moreover, we provide a lever $f^4$, Fig. 3, mounted on the rod $f$, and which engages with a stud $r^5$, fixed in the pawl $r'$. When the lace-point bar is rotated to throw the pins $l^5$ out of action, the said lever $f^4$ disengages the pawl $r'$, so that during the narrowing of the toe, when lacework is not required, the Jacquard cylinders remain stationary.

In making a lace stocking or sock by means of our invention, the plain or upper part of the said stocking or sock is knitted in the usual manner. The lace mechanism above described is then brought into action and the lace-border from 1 to 2 in Fig. 17 is produced, during which time the Jacquard cylinders are rotated in one direction only by the pawl $r'$. On the completion of the border the Jacquard cylinders are racked round four more times by the pawl $r'$ in the same direction, thus making the pattern from 2 to 3 in Fig. 17. The lugs on the chain then throw out the pawl $r'$ and throw in the pawl $r^3$, which acts upon the wheel $r^4$, having teeth cut to the pitch of four plates or lags, as shown in Fig. 18. Thus as the lace appliance rises it racks the Jacquard cylinders back to the position they were in after the completion of the border. The lugs on the chain then throw out the pawl $r^3$ and throw in the pawl $r'$, which again racks the Jacquard cylinders and thus repeats the pattern. This repeating of the pattern goes on until the work is knitted to the line 4 in Fig. 17, when, instead of the pawl $r^3$ coming into action, the pawl $r'$ is allowed to continue its action until the next four plates or lugs are reached, making the pattern from 4 to 5, Fig. 17. The pawl $r^3$ then comes into action and repeats the pattern in the same manner as before, until the line 6 is reached. The pawl $r'$ is then kept in action until the work is knitted to the line 7. Then the pawl $r^3$ again comes into action, repeating the pattern between 6 and 7 until the line 8 is reached. The next plate or lug has no stops in it, therefore plain work is knitted. The lever $t^4$ then disengages the pawl $r'$, thus stopping the revolution of the Jacquard cylinders and allowing the toe to be completed without any pattern being produced thereon.

For patterns out of the ordinary run—that is to say, for extraordinary patterns—a Jacquard band $l^{11}$ of the ordinary construction may be passed round the cylinders $l$, as shown in Fig. 9, and made to operate the points $l^5$ in a manner that will be well understood.

In the modification of our invention shown in Figs. 14 and 15 the lace-points $e$ are fixed in bell-crank levers $e'$, pivoted at $e^{10}$ to the comb-bar $e^3$. $e^6$ are springs, one for each lever $e'$, secured to the bosses $e^8$, which carry the comb-bar $e^3$. The said springs act on the inner ends of the said levers in such a way as to keep the lace-points $e$ down—that is to say, to keep the lower ends of the levers $e'$ pressed home within the comb-bar $e^3$. In this modification the Jacquard cylinders are provided with projecting pegs $l^4$ for operating the lace-point levers instead of holes, as in the arrangement hereinbefore described. The said pegs are inserted in the holes provided for them in the cylinder plates or lags according to any arrangements, so as to produce any desired pattern. The levers are retained in their normal positions by the action of the said springs $e^6$ immediately the Jacquard cylinders are raised. By forming the springs $e^6$ of the curved shape shown we are enabled to so depress the levers $e'$ as to bring their extremities into contact with the curved portion of the springs, as shown in Fig. 15, and the said levers are then placed out of the range of the cylinder-pegs $l^4$, or, in other words, the points $e$ are placed out of action. We provide a bar $s^3$, running the whole length of the machine underneath the inner arms of the levers $e'$, by means of which the whole of the levers may be raised again and put into the working position at once. This bar is operated in a similar manner to the bar $s^2$ hereinbefore referred to.

Although we have herein described and shown our improvements as applied to a knitting-machine known as a "Cotton's frame," it is obvious that our said improvements are also applicable to other machines.

What we claim is—

1. In a machine for the manufacture of lace hosiery, the combination, with an upright needle-frame, of a set of lace-points arranged above the needles and supported on a bar, bearings for said bar, said bar being connected with a slide, and an intermittently-actuated pattern-wheel, the periphery of which bears against two pins on the said slide and imparts endwise motion to the said set of lace-points alternately in either direction to adjust the same relatively to the work, substantially as hereinbefore described.

2. In a machine for the manufacture of lace hosiery, the combination, with an upright needle-frame, of a set of lace-points arranged above the needles, a bar on which said points are supported, bearings for said bar, a slide connected with said bar, an intermittently-actuated pattern-wheel, the periphery of which bears against two pins on the said slide and imparts endwise motion to the said set of lace-points alternately in either direction according to the pattern to be produced, a pattern-chain, mechanism consisting of a Jacquard cylinder, and a bar $s^2$, supported by hangers, substantially as described, for putting the lace-points in and out of action as required, and mechanism for intermittently rotating the Jacquard cylinder, comprising ratchet-wheels $r^2$ $r^4$, pawls $r'$ $r^3$, lever $w^5$, cam-wheel $w^4$, ratchet-wheel $w^2$, pawl $w'$, shaft $u$, arm $w$, connecting pawl $w'$ with the shaft $u$, means for oscillating the shaft $u$, and a lever $w^9$, adapted to lift pawl $w'$ out of gear with the ratchet-wheel when it encounters the studs on the pattern-chain, substantially as described.

3. In a machine for the manufacture of lace hosiery, the combination, with an upright needle-frame, of a set of lace-points, arranged above the needles and supported on a bar, bearings for said bar, said bar being connected with a slide, an intermittently-actuated pattern-wheel, the periphery of which bears against two pins on the said slide and imparts endwise motion to the said set of lace-points in either direction according to the pattern to be produced, mechanism consisting of a Jacquard pattern cylinder, and a bar $s^2$ supported by hangers, substantially as above described, for putting the lace-points in and out of action as required, and means substantially as above described for intermittently rotating the said pattern-cylinder, substantially as and for the purposes above specified.

4. The combination, with the lace-point bar $f$ and the lace-points $e$, carried thereby, of a fork $f^3$, fixed on the said bar, a sliding block $h$, having an arm $h'$, engaging with the said fork $f^3$ and having pins or projections $h^4$ $h^5$, a pattern-wheel $k$, arranged to rotate between the said pins or projections, and means substantially such as above described for intermittently rotating the said pattern-wheel, whereby the said sliding block and the bar $f$ are moved endwise alternately in each direction, substantially as and for the purposes above specified.

5. In a machine for the manufacture of lace hosiery, the combination, with the lace-points, of the automatically and intermittently rotated Jacquard cylinder, mechanism substantially as above described for moving said Jacquard cylinder toward and away from the lace-points, and pawls $r'$ $r^3$ and ratchet-wheels $r^2$ $r^4$, by which said cylinder is partially rotated in one or other direction when it is moved toward and away from the lace-points, substantially as and for the purposes specified.

6. In a machine for the manufacture of lace hosiery, the combination, with the lace-points, the pattern-cylinder, and means for moving the said cylinder to and from the said points, of a repeating device consisting, essentially, of two ratchet mechanisms $r'$ $r^3$ $r^2$ $r^4$ for the forward and backward movement of the said cylinder, cam-and-ratchet mechanism $w'$ $w^2$ $w^4$, the lever $w^5$, actuated thereby for displacing the parts $r'$ $r^2$, an arm $w$, secured on a shaft $u$ for actuating the pawl $w'$, a lever $w^9$ for disengaging the said pawl, and a pattern-chain for controlling the action of this lever, substantially as and for the purposes above specified.

7. In a machine for the manufacture of lace hosiery, the combination of the slides $e'$, carrying the lace-points $e$ and held in the bed $e^3$, the bar $s^2$ for lifting the said slides out of action, and springs $e^6$ for holding the said slides in their raised position, substantially as and for the purposes set forth.

In testimony whereof we have hereunto set our hands in the presence of two subscribing witnesses.

HENRY CLARKE.
THOMAS MAWBY.

Witnesses:
STEPHEN PLAKE,
  16 Ann Street, Leicester.
J. A. WARD,
  6 Nichols Street, Leicester.